(12) United States Patent
Meek

(10) Patent No.: US 8,127,861 B2
(45) Date of Patent: Mar. 6, 2012

(54) FRONT FOLDING AGRICULTURAL IMPLEMENT FRAME WITH REARWARDLY TELESCOPING TONGUE

(75) Inventor: Roger L Meek, Salina, KS (US)

(73) Assignee: AGCO Corporation, Duluth, GA (US)

( * ) Notice: Subject to any disclaimer, the term of this patent is extended or adjusted under 35 U.S.C. 154(b) by 1302 days.

(21) Appl. No.: 11/332,909

(22) Filed: Jan. 17, 2006

(65) Prior Publication Data

US 2007/0163791 A1 Jul. 19, 2007

(51) Int. Cl.
*A01B 49/00* (2006.01)

(52) U.S. Cl. .................................................... 172/311

(58) Field of Classification Search .................. 172/311
See application file for complete search history.

(56) References Cited

U.S. PATENT DOCUMENTS

| | | | |
|---|---|---|---|
| 3,491,836 A | 1/1970 | Doepker | |
| 3,654,999 A * | 4/1972 | Fischer | 172/311 |
| 3,791,673 A * | 2/1974 | Hornung | 172/311 |
| 4,008,833 A * | 2/1977 | Gandrud et al. | 222/626 |
| 4,088,346 A * | 5/1978 | Schreiner et al. | 280/656 |
| 4,126,187 A * | 11/1978 | Schreiner et al. | 172/311 |
| 4,137,852 A | 2/1979 | Pratt | |
| 4,223,743 A * | 9/1980 | Garrison | 172/583 |
| 4,236,585 A * | 12/1980 | Adee et al. | 172/587 |
| 4,319,643 A | 3/1982 | Carter et al. | |
| 4,364,581 A | 12/1982 | Shoup | |
| 4,425,971 A * | 1/1984 | Allen | 172/311 |
| 4,496,004 A * | 1/1985 | Frase et al. | 172/311 |
| 4,504,076 A | 3/1985 | Bedney | |
| 4,567,689 A * | 2/1986 | Lemons | 47/1.7 |
| 4,582,143 A * | 4/1986 | Pratt | 172/311 |
| 4,596,290 A * | 6/1986 | Bedney | 172/311 |
| 4,660,651 A * | 4/1987 | Pfenninger et al. | 172/311 |
| 4,664,202 A | 5/1987 | Applequist et al. | |
| 4,763,915 A | 8/1988 | Risser | |
| 4,867,245 A * | 9/1989 | Stevens | 172/311 |
| 4,944,355 A | 7/1990 | Karchewski | |
| 4,945,997 A | 8/1990 | Adee | |
| 5,024,279 A | 6/1991 | Warner et al. | |
| 5,113,956 A | 5/1992 | Friesen et al. | |
| 5,154,240 A | 10/1992 | Carrick | |
| 5,232,054 A | 8/1993 | Van Blaricon et al. | |
| 5,488,996 A | 2/1996 | Barry et al. | |
| 5,647,440 A | 7/1997 | Barry et al. | |
| 5,660,237 A | 8/1997 | Boyko et al. | |
| 5,787,988 A | 8/1998 | Harlan et al. | |
| 5,839,516 A | 11/1998 | Arnold et al. | |
| 6,068,062 A * | 5/2000 | Brueggen et al. | 172/311 |
| 6,076,613 A | 6/2000 | Frasier | |
| 6,082,467 A | 7/2000 | Friesen | |
| 6,202,756 B1 | 3/2001 | Hundeby et al. | |
| 6,206,105 B1 | 3/2001 | Friesen | |

(Continued)

*Primary Examiner* — Thomas Will
*Assistant Examiner* — Joel F. Mitchell
(74) *Attorney, Agent, or Firm* — Erickson, Kernell, Derusseau & Kleypas, LLC

(57) ABSTRACT

A forwardly folding agricultural implement frame includes a tongue having a forward section and a rearward section telescopically extendable relative to the forward section. A carriage having support wheels is mounted on the forward tongue section. Left and right wings are pivotally connected to the rearward tongue section and foldable between a field position wherein the wings are generally perpendicular to the tongue and a transport position wherein the wings are generally parallel to the tongue. During the folding process, the carriage remains generally centered under the frame such that the majority of the weight of the implement is carried by the wheels and not shifted forwardly to the tractor drawbar.

36 Claims, 14 Drawing Sheets

U.S. PATENT DOCUMENTS

| | | |
|---|---|---|
| 6,209,657 B1 | 4/2001 | Friggstad |
| 6,269,887 B1 | 8/2001 | Friggstad |
| 6,293,352 B1 | 9/2001 | Hundeby et al. |
| 6,325,155 B2 | 12/2001 | Friggstad |
| 6,336,511 B1 | 1/2002 | Friggstad |
| 6,408,950 B1 | 6/2002 | Shoup |
| 6,415,873 B1 | 7/2002 | Hudgins |
| 6,502,645 B1 | 1/2003 | Brueggen et al. |
| 6,550,543 B1 | 4/2003 | Friggstad |
| 6,609,574 B1 | 8/2003 | Collins |
| 6,702,035 B1 | 3/2004 | Friesen |
| 6,860,335 B2 | 3/2005 | Arnett |
| 6,902,010 B2 | 6/2005 | Shoup |
| 7,604,068 B1 * | 10/2009 | Friesen ......................... 172/311 |
| 2006/0090910 A1 * | 5/2006 | Houck ......................... 172/272 |

* cited by examiner

FRONT FOLDING AGRICULTURAL IMPLEMENT FRAME WITH REARWARDLY TELESCOPING TONGUE

BACKGROUND OF THE INVENTION

1. Field of the Invention

This invention relates to folding agricultural implements, and in particular to a frame for a forwardly folding implement having a tongue which extends rearwardly during folding such that the weight of the implement remains supported primarily by wheels of the implement and is not unduly shifted to the tractor drawbar.

2. Description of the Related Art

Agricultural implements, such as planters, drills, cultivators, fertilizer applicators and the like are often built on a frame which is designed to fold up for road transport and to unfold for field use. One common type of folding implement frame is known as a forward folding frame. Forward folding frames typically comprise a longitudinal tongue and left and right wings pivotally connected to the tongue. The wings are moveable between a field position wherein the wing are generally perpendicular to the tongue and a transport position wherein the wings extend forwardly and are oriented generally parallel to the tongue. In such a design, the tongue must provide a sufficient distance between the wing pivots and the rear of the tractor for the wings to be able to move into their forwardly extended position without hitting the tractor.

If the tongue were of a fixed length, an implement of a practical width would be excessively long and awkward to turn in the field, therefore forwardly folding implement frames have typically been provided with telescoping tongues which extend as the implement folds. For example, U.S. Pat. No. 5,113,956 to Friesen et al. discloses a forwardly folding implement frame having a telescoping tongue which extends forwardly as the implement folds in order to provide sufficient clearance for the wings. A problem with forwardly extending tongues of this type is that, as the tongue extends, the wheels supporting the implement are pushed rearwardly, away from the tractor. This causes the weight of the implement to shifted from the supporting wheels to the tractor drawbar. Excessive weight on the tractor drawbar can cause damage to the tractor or cause the front of the tractor to tend to lift, making it unstable. An implement of this type can also be difficult to unhitch from the tractor since the large percentage of its weight resting on the drawbar must be lifted with a jack during the unhitching procedure.

A previous attempt to address this problem is disclosed by U.S. Pat. No. 5,488,996 to Barry et al. This design uses a forwardly extending tongue like the one taught by Friesen et al. '956 but mounts the supporting wheels on a slidable carriage which moves forward as the tongue extends. The forward movement of the wheel carriage reduces the down load on the tractor when the implement is in the transport position, however it appears that the majority of the weight of the implement is still carried by the drawbar.

SUMMARY OF THE INVENTION

The present invention comprises a folding agricultural implement frame having a tongue with a forward tongue section and a rearward tongue section telescopically extendable relative to the forward section. A wheel carriage is mounted on the forward tongue section and supports the frame above the ground. Left and right wings are pivotally connected to the rearward tongue section and movable between an outwardly extending field position and a forwardly extending transport position.

DETAILED DESCRIPTION OF THE PREFERRED EMBODIMENTS

Figure 1:
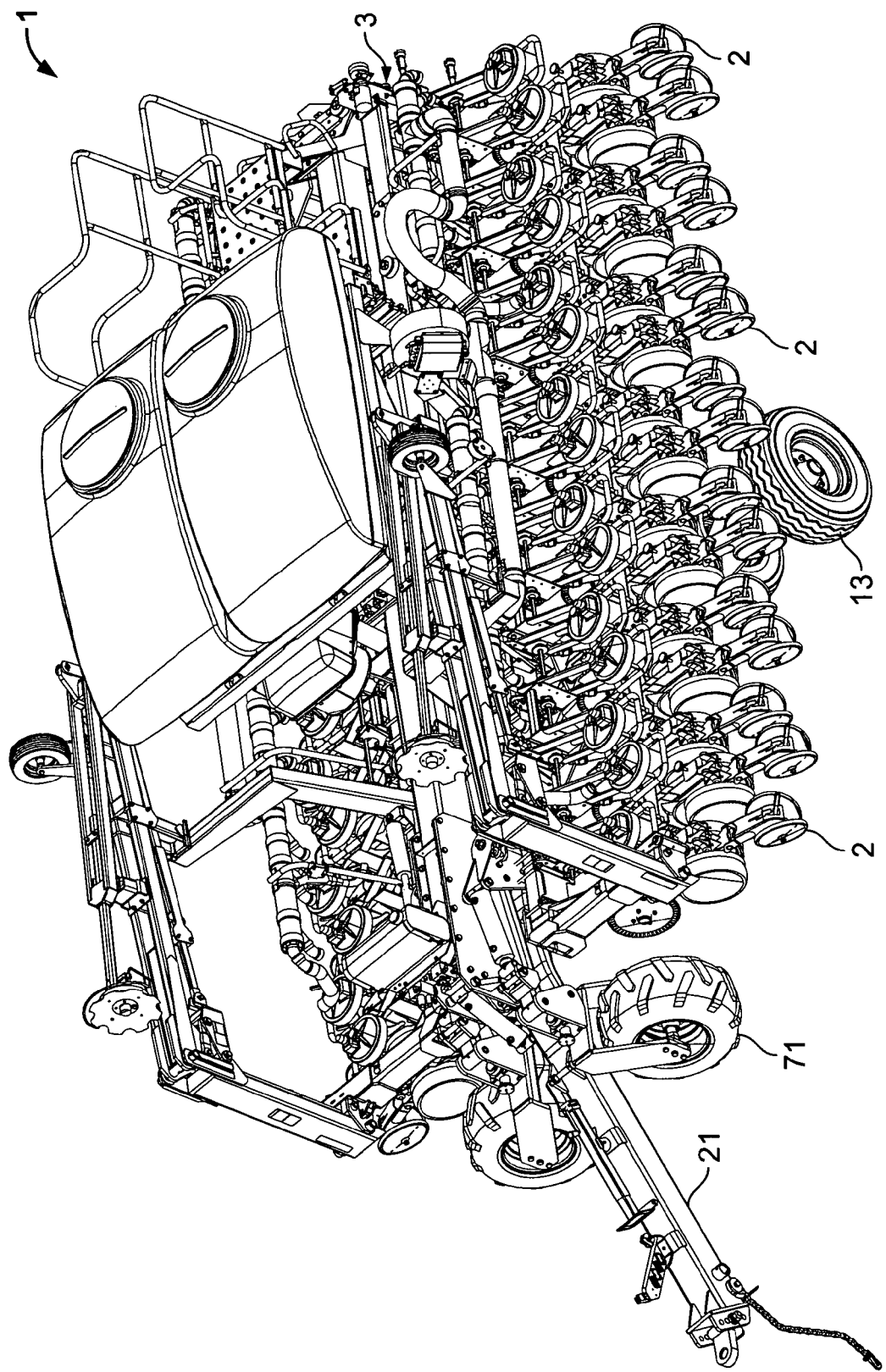
FIG. 1 is a perspective view of a planter incorporating a front folding agricultural implement frame according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 generally designates a farm implement having a folding frame 3 embodying the present invention. The implement 1 is shown as being a planter having row units 2 mounted on the folding frame 3, however it is to be understood that the folding frame 3 may have application to agricultural implements other than planters, and that the depiction of the implement 1 as a planter is not intended to be limiting. For example, the frame 3 could be adapted for use on seed drills, cultivators, fertilizer and pesticide applicators, and the like.

Figure 2:
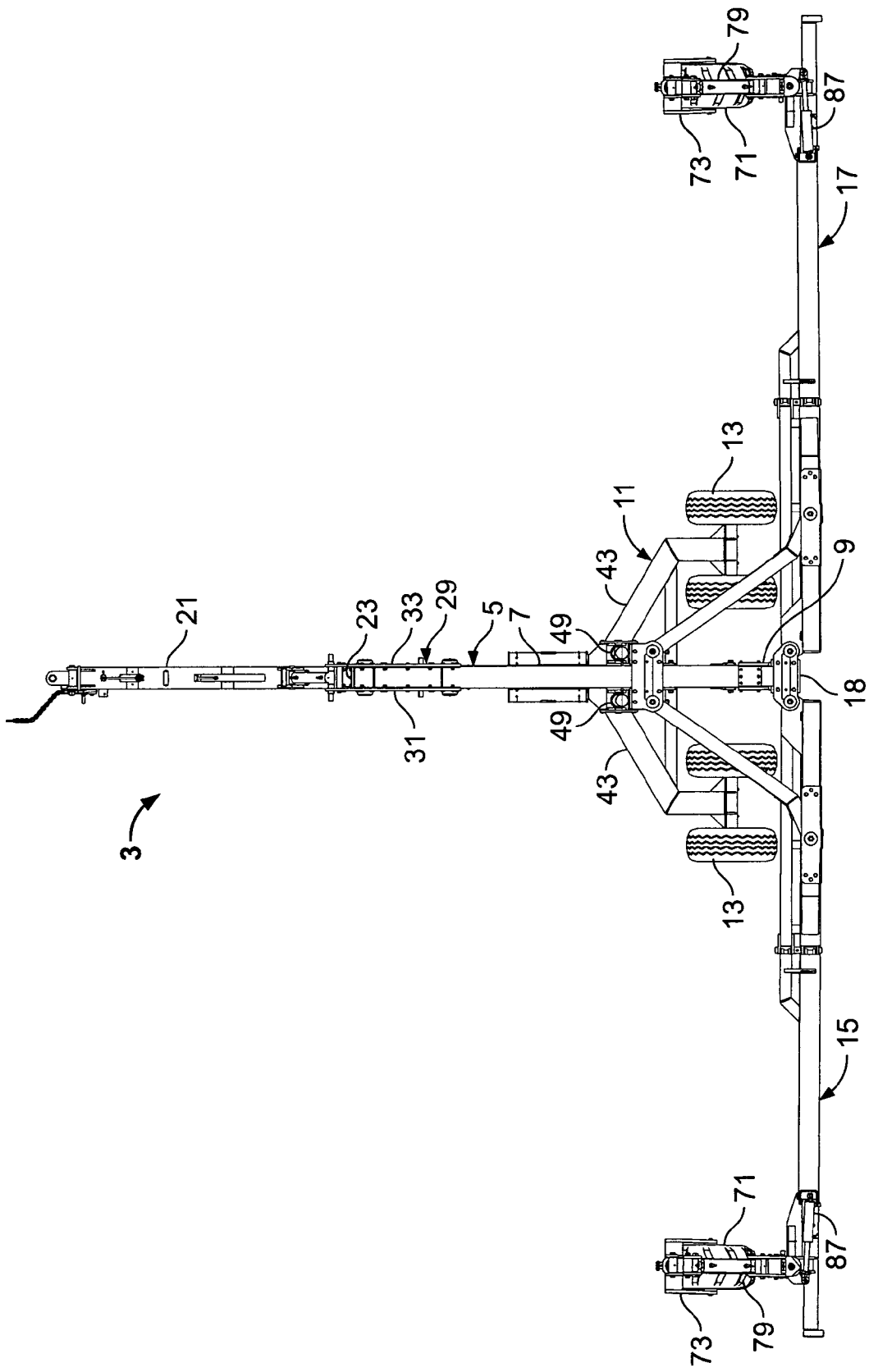
FIG. 2 is a top plan view of the front folding agricultural implement frame showing the frame in a field position.
Figure 3:
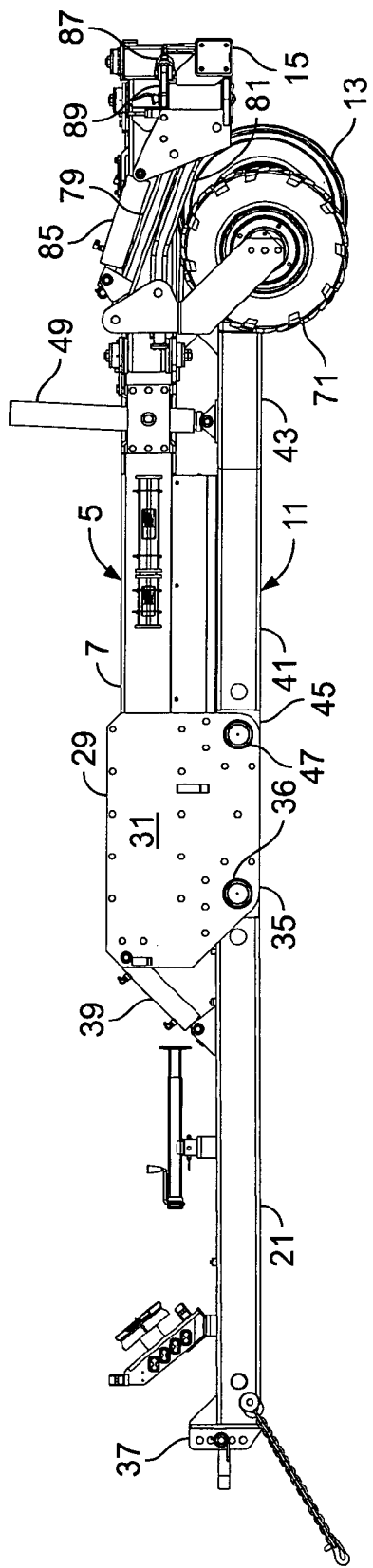
FIG. 3 is a left side elevational view of the frame of FIG. 2.

Referring to FIGS. 2-3, the frame 3 generally includes a tongue 5 having a forward tongue section 7 and a rearward tongue section 9 telescopically extendable relative to the forward tongue section 7. A carriage 11 having wheels 13 for supporting the implement 1 above the ground is mounted on the forward tongue section 7. Because the carriage 11 is fixed to the forward tongue section 7 and the rearward tongue section 9 is moveable relative to the forward tongue section 7 and the carriage 11, the forward tongue section 7 may also be designated as the stationary tongue section and the rearward tongue section 9 may be referred to as a moveable or telescoping tongue section.

Left and right wings 15 and 17, respectively, are pivotally connected to a rearward end 18 of the rearward tongue section 9 and foldable between a field position (shown in FIGS. 2 and 3) wherein the wings 15 and 17 are generally perpendicular to the tongue 5 and a transport position (shown if F*igs*.12 and 13) wherein the wings 15 and 17 are generally parallel to the tongue 5. A hitch 21 is pivotally connected to a forward end 23 of the forward tongue section and is connectable to a drawbar of a tractor (not shown).

Figure 9:
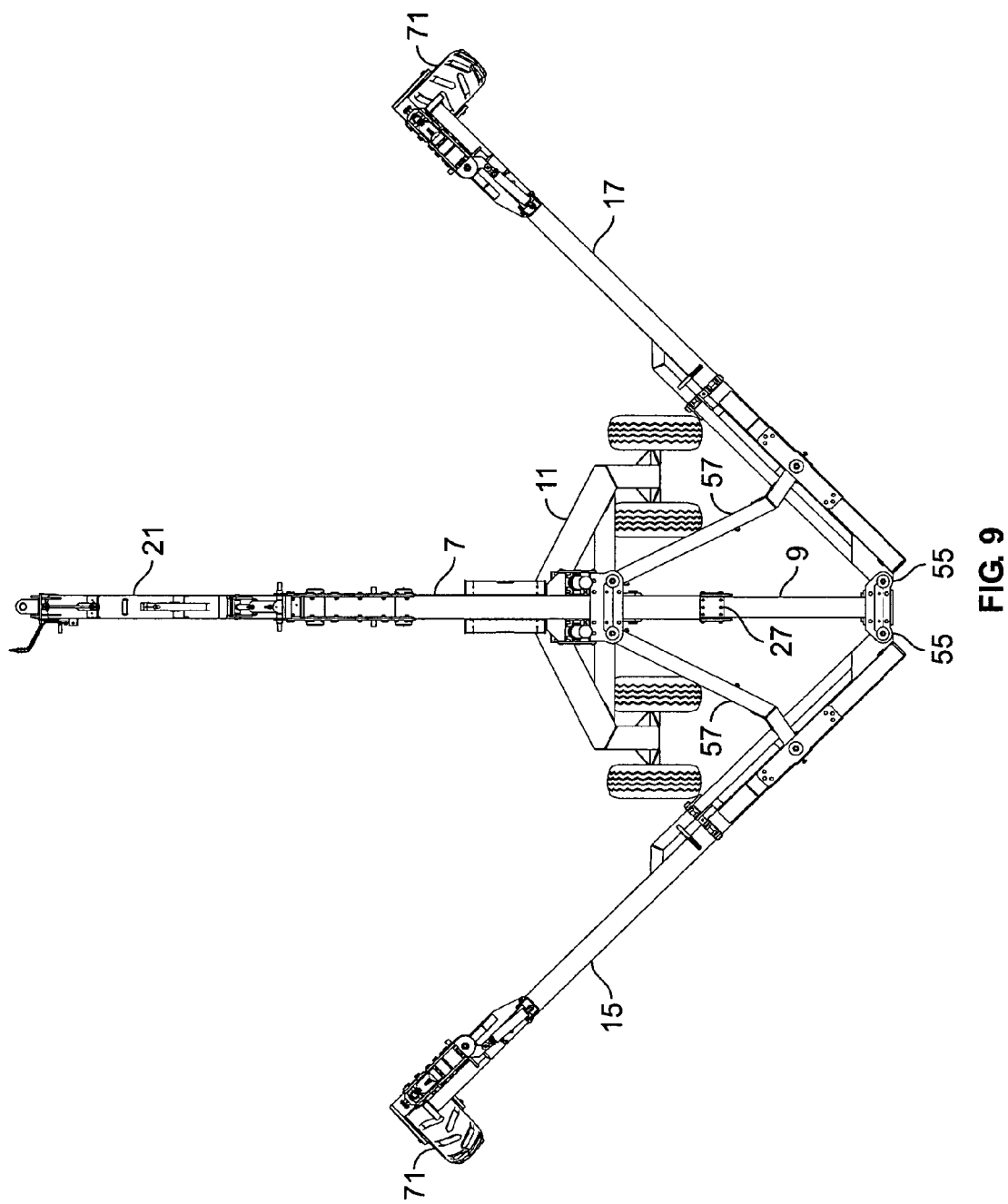
FIG. 9 is a top plan view of the front folding agricultural implement frame showing wings thereof in a partially folded position.

As the wings 15 and 17 move from the field position toward the transport position (as shown in FIG. 9) the rearward tongue section 9 extends rearwardly to provide sufficient distance between the tractor and the rearward end 18 of the rearward tongue section 9 for the wings 15 and 17 to come forward. During this folding process, the carriage 11 remains generally centered under the implement 1 such that the majority of the weight of the implement 1 is carried by the wheels 13 and not shifted forwardly to the tractor drawbar.

Referring again to FIGS. 2 and 3 and looking at the frame 3 in further detail, the forward tongue section 7 and rearward tongue section 9 are generally constructed of steel box material. The rearward tongue section 9 is somewhat smaller in cross section than the forward tongue section 7 and is telescopically received within the forward tongue section 7. A tongue extension cylinder (not shown) located inside the tongue 5 has a first end connected to the forward tongue section 7 and a second end connected to the rearward tongue section 9. The tongue extension cylinder is hydraulically operable to extend the rearward tongue section 9 outwardly from a rearward end 27 of the forward tongue section 7 and to retract the rearward tongue section 9 back into the forward tongue section 7.

A clevis 29 is connected to the forward tongue section 7 proximate the forward end 23 thereof and comprises left and right side plates 31 and 33, respectively, mounted on opposed left and right sides of the forward tongue section 7. The hitch 21 has a rearward end 35 positioned between the side plates 31 and 33 and is pivotally connected to the side plates 31 and 33 by a hitch pivot 36. A forward end 37 of the hitch 21 is adapted for connection to the tractor drawbar. A hitch cylinder 39 has a first end connected to the hitch 21 and a second end connected to the clevis 29. The hitch cylinder 39 is hydraulically operable to raise and lower the rearward end 35 of the hitch 21 relative to the forward end 37.

The carriage 11 is generally Y-shaped and includes a leg 41 and a pair of branches 43 extending outwardly therefrom. The leg 41 has a forward end 45 positioned between the side plates 31 and 33 of the clevis 29 and is pivotally connected to the side plates 31 and 33 by a carriage pivot 47. The leg 41 is positioned beneath the forward tongue section 7 in lateral alignment therewith. Each branch 43 of the carriage 11 carries a pair of the wheels 13 which are thus positioned laterally outwardly from the leg 41 of the carriage 11 and outward of the forward tongue section 7 on opposed sides thereof. A pair of tongue lift cylinders 49 are connected to the forward tongue section 7 on opposite sides thereof and each includes a ram end connected to the carriage 11. The tongue lift cylinders 49 are hydraulically operable to raise and lower the rearward end 27 of the forward tongue section 7 relative to the carriage 11. When the tongue lift cylinders 49 and the hitch cylinder 39 are operated simultaneously, the entire tongue 5 may be raised or lowered relative to the ground (the tongue 5 is shown lowered in FIG. 3 and raised in FIG. 5). A scissors linkage 51 (see FIG. 5) has opposed ends connected to the leg 41 of the carriage 11 and the forward section 7 of tongue 5, respectively, and acts to keep the leg 41 centered under the tongue 5 as the tongue 5 is raised and lowered.

It should be noted that the carriage 11 is connected to the forward tongue section 7 by the carriage pivot 47 and the scissors linkage 51, and is thus fixed to the forward tongue section 7 in both the lateral and longitudinal (or fore and aft) directions.

Figure 4:
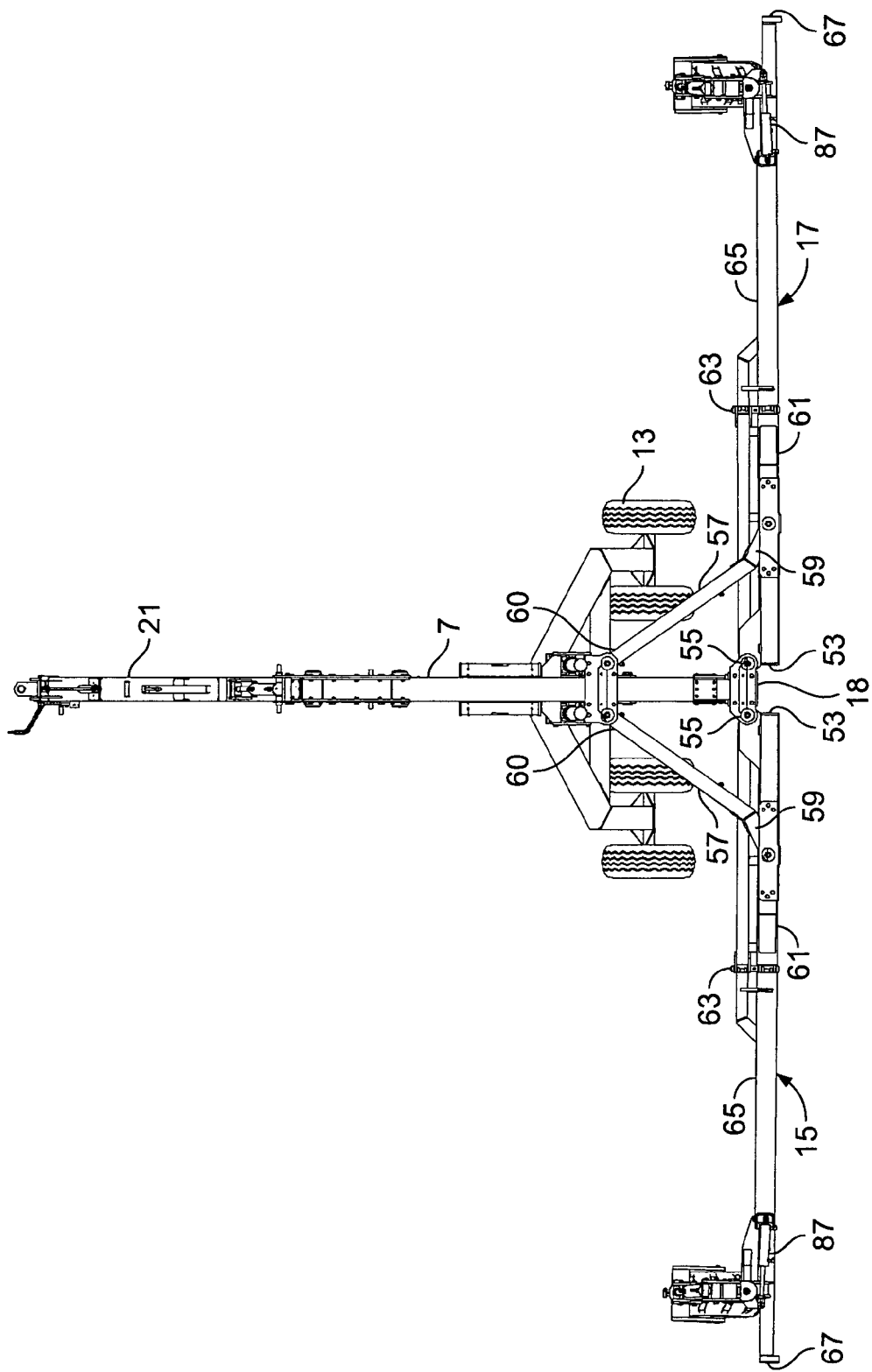
FIG. 4 is a top plan view of the front folding agricultural implement frame showing the frame in a fully raised position.

Referring to FIG. 4, the wings 15 and 17 each include an inner end 53 which is pivotally connected to the rearward end 18 of the rearward tongue section 9 by a respective wing pivot 55. Associated with each wing 15 and 17 is a wing link 57 which has a first end 59 pivotally connected to the respective wing 15 or 17 outward of the inner end 53 thereof and a second end 60 pivotally connected to the forward tongue section 7.

Each of the wings 15 and 17 further includes an inner wing section 61 extending from the inner end 53 to a wing flex pivot 63 and an outer wing section 65 extending from the wing flex pivot 63 to an outer wing end 67. The wing flex pivots 63 allow each outer wing section 65 to pivot upwardly or downwardly relative to the respective inner wing section 61 in order to follow uneven terrain while the implement 1 is in the field. The wing pivots 55, however, are not designed to allow the inner wing sections 61 to pivot upwardly or downwardly relative to one another, and the inner wing sections 61 therefore combine to form a rigid center wing portion. As a result of the vertically flexible wing flex pivots 63 and the vertically rigid wing pivots 55, the implement 1 effectively presents three wing portions for following uneven terrain; a center portion comprising the two inner wing sections 61, and a pair of outer portions comprising the outer wing sections 65. Each wing 15 and 17 may include a wing cylinder (not shown) connected between the inner wing section 61 and outer wing section 65 at the wing flex pivot 63 to control the flexing of the respective wing 15 or 17. The wing cylinders would be allowed to float while the implement 1 is in the field so that the wings could flex with the terrain.

Figure 5:
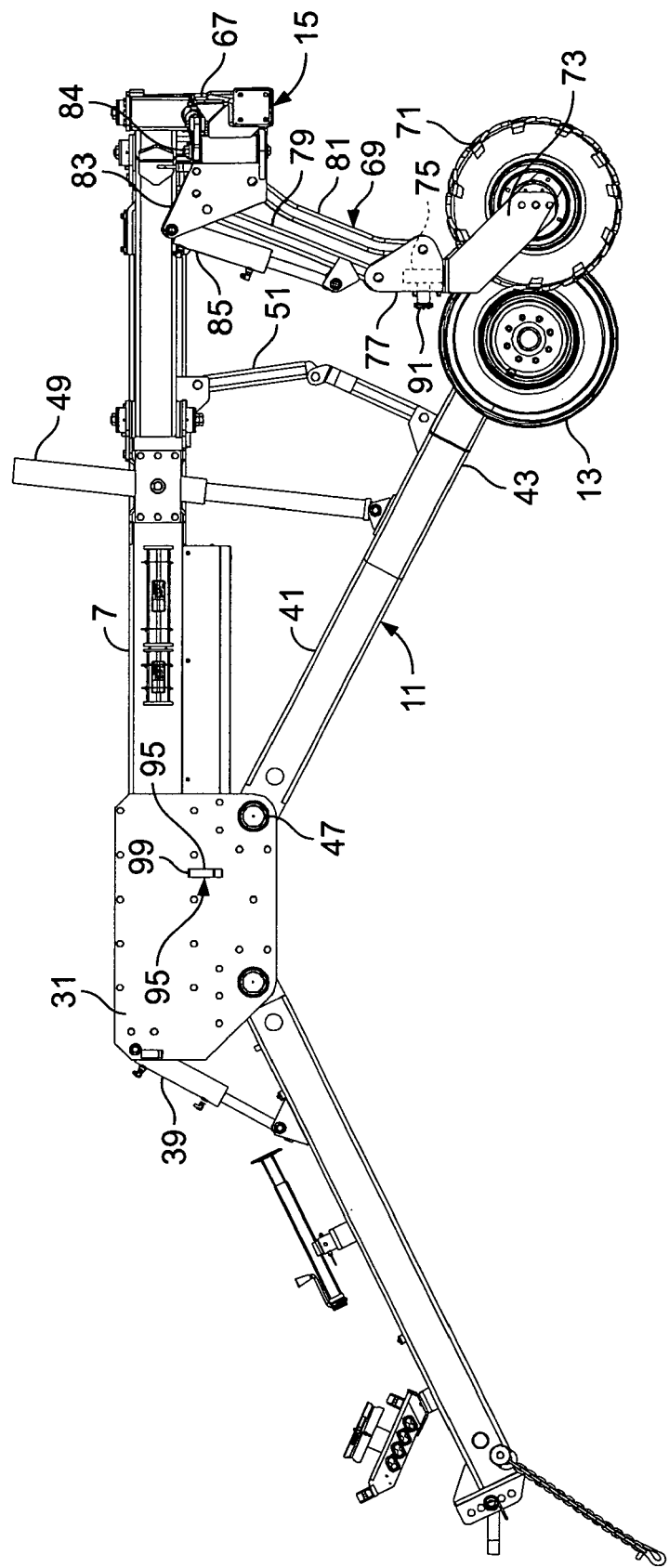
FIG. 5 is a left side elevational view of the frame of FIG. 4.

Referring to FIG. 5, each wing 15 or 17 is supported by a respective caster wheel assembly 69 which is pivotally mounted to the front of the respective outer wing section 65 and foldable relative thereto. Each caster wheel assembly 69 includes a wheel 71 rotatably mounted between opposed legs of a yoke 73. The yoke 73 includes a caster pivot shaft 75 which extends upwardly therefrom and is rotatably received by a lower caster wheel mount 77. The caster pivot shaft 75 defines a caster wheel pivot axis. Upper and lower parallel links 79 and 81 connect the lower caster wheel mount 77 to an upper caster wheel mount 83, creating a parallelogram linkage. The upper caster wheel mount 83 is pivotally connected to the respective outer wing section 65 for movement about a caster assembly pivot axis 84. The caster wheel assembly 69 is moveable about the caster assembly pivot axis 84 between a folded position (shown in FIG. 7) wherein the parallel links 79 and 81 are generally parallel to the respective wing 15 or 17 and an extended position (shown in FIG. 3) wherein the parallel links 79 and 81 are generally perpendicular to the respective wing 15 or 17. A caster wheel lift cylinder 85 is connected between the upper parallel link 79 and the upper caster wheel mount 83 and is operable to vary the spacing between wheel 71 and the respective wing 15 or 17.

Figure 6:
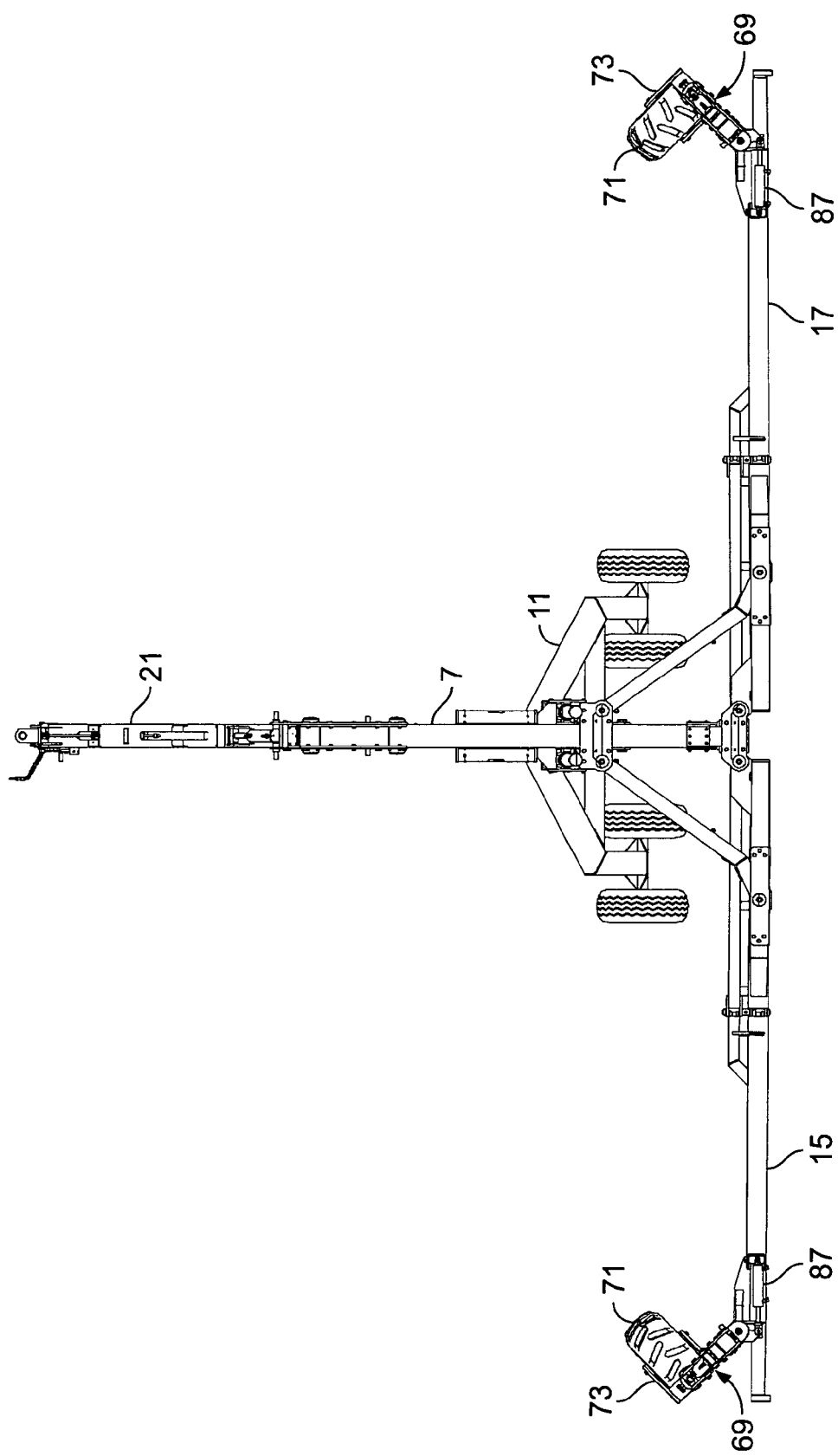
FIG. 6 is a top plan view of the front folding agricultural implement frame showing caster wheel assemblies thereof in a partially folded position.
Figure 7:
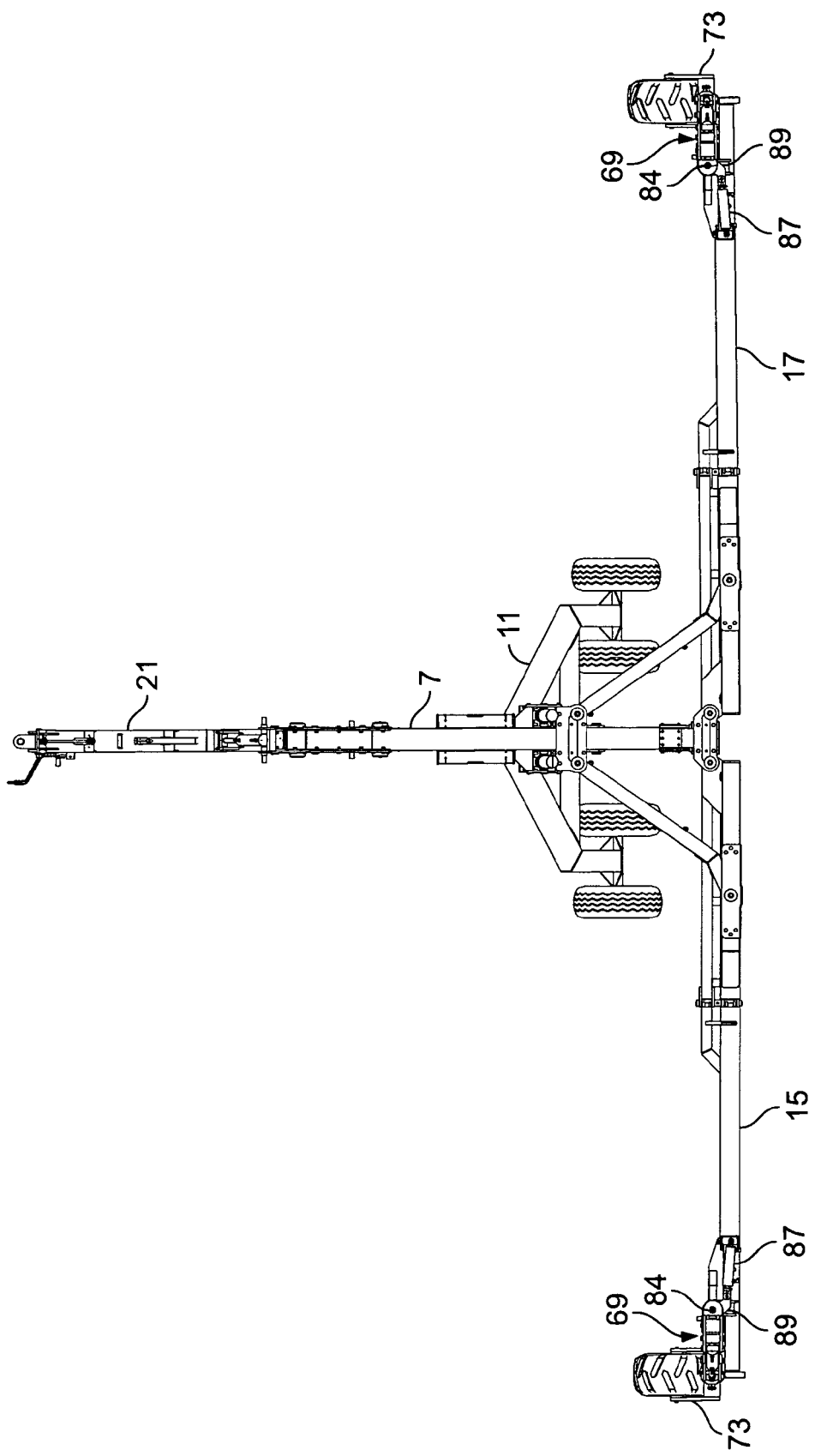
FIG. 7 is a top plan view of the front folding agricultural implement frame showing caster wheel assemblies thereof in a fully folded position.

Referring to FIGS. 6 and 7, a caster wheel pivot cylinder 87 is connected between the respective wing 15 or 17 and a lever arm 89 on the upper caster wheel mount 83 and is operable to move the caster wheel assembly 69 between its folded and extended positions.

Figure 12:
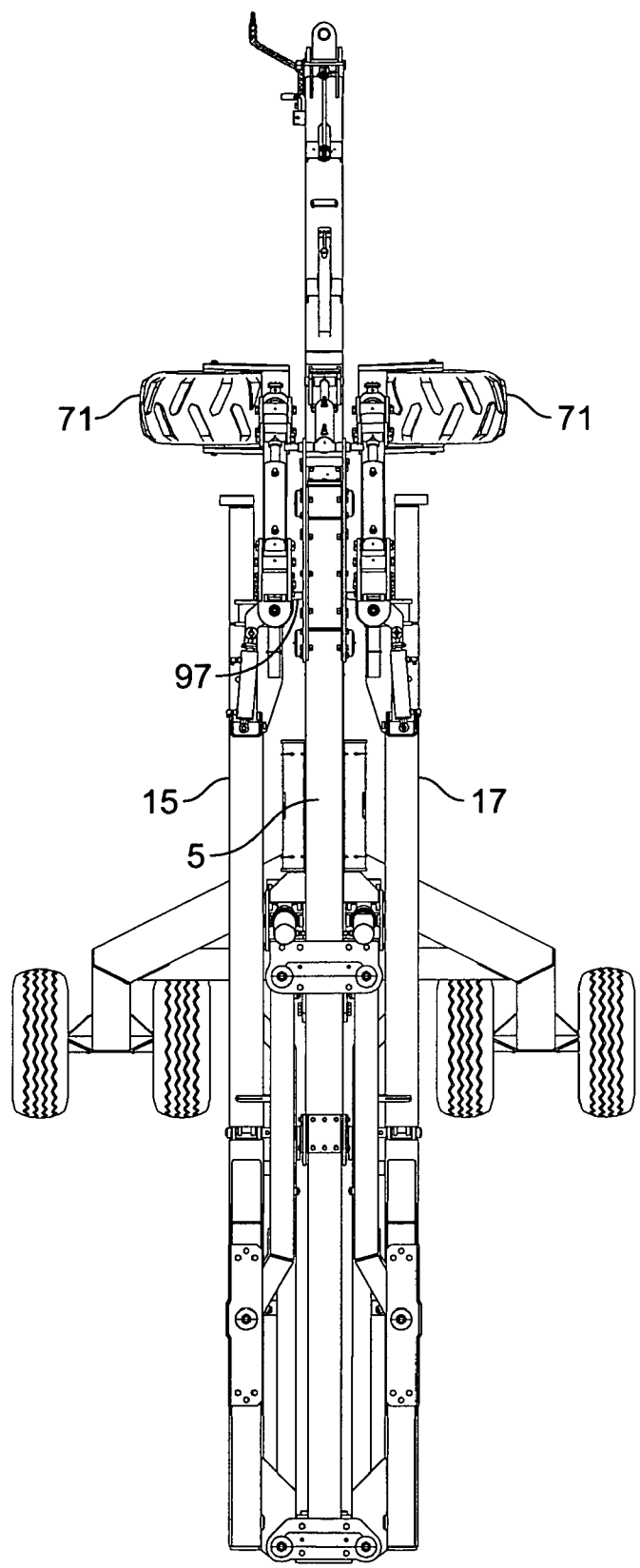
FIG. 12 is a top plan view of the front folding agricultural implement frame showing wings thereof in a fully folded position and the caster wheel assemblies lifted.
Figure 13:
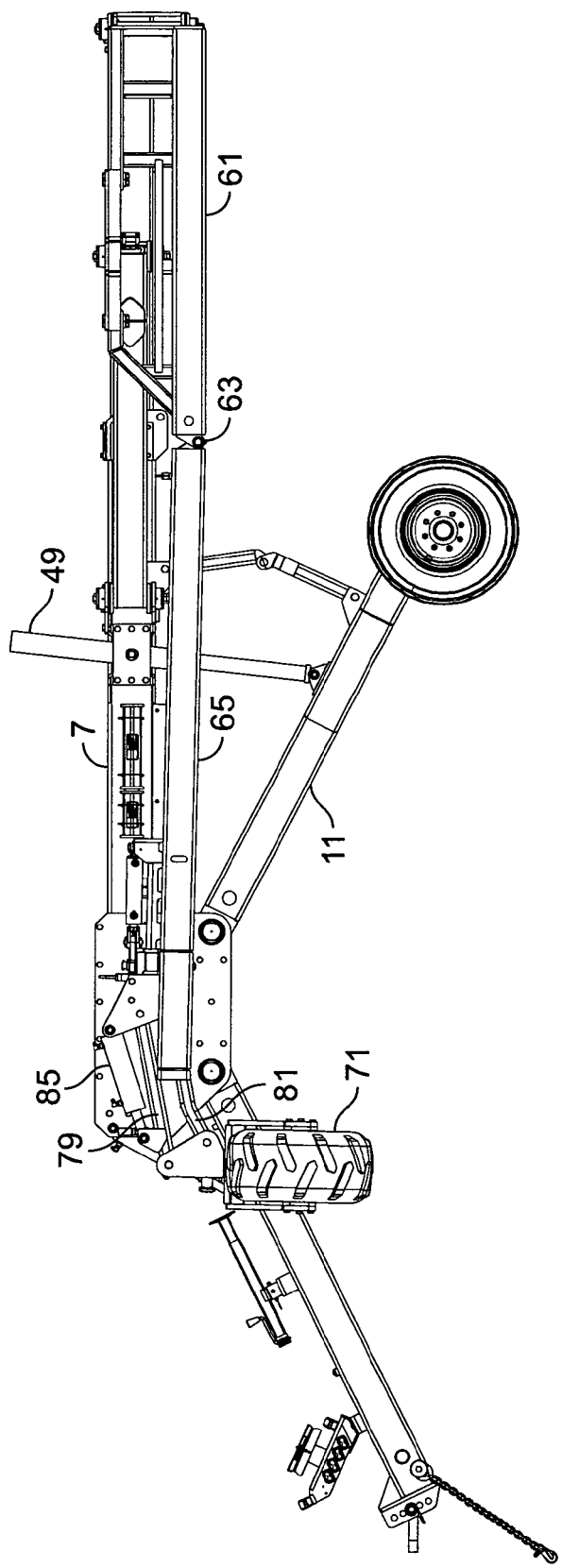
FIG. 13 is a left side elevational view of the frame of FIG. 12.

When the wings 15 and 17 are in their transport position (as shown in FIGS. 12 and 13) it is desired that the caster wheels 71 remain in a first position generally perpendicular to the links 79 and 81 and extending outwardly, away from the tongue 5. Each caster wheel 71 is releasably retained in this first position by a detent 91 (see FIG. 5) mounted on the respective lower caster wheel mount 77 which engages the respective caster pivot shaft 75. The detents 91 may, for example, each comprise a cam follower bearing (not shown) urged toward the respective caster pivot shaft 75 by a compression spring. The caster pivot shafts 75 each include a notch positioned to be engaged by the respective detent 91 when the respective caster wheel 71 moves into the first position. The action of the detents 91 is overcome by caster forces created by the ground acting on the caster wheels 71 during unfolding, allowing the caster wheels 71 to move out of the first position as the wings 15 and 17 unfold.

Figure 8:
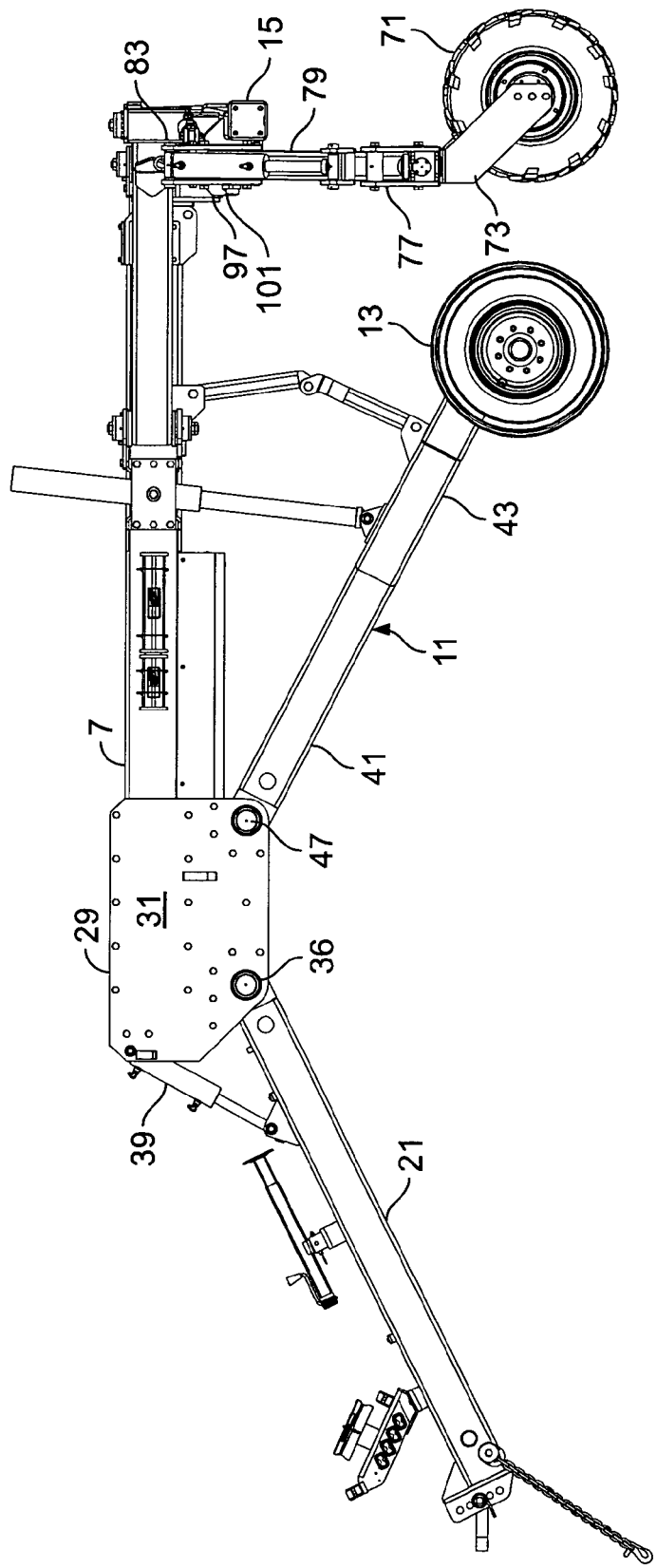
FIG. 8 is a left side elevational view of the frame of FIG. 7.
Figure 14:
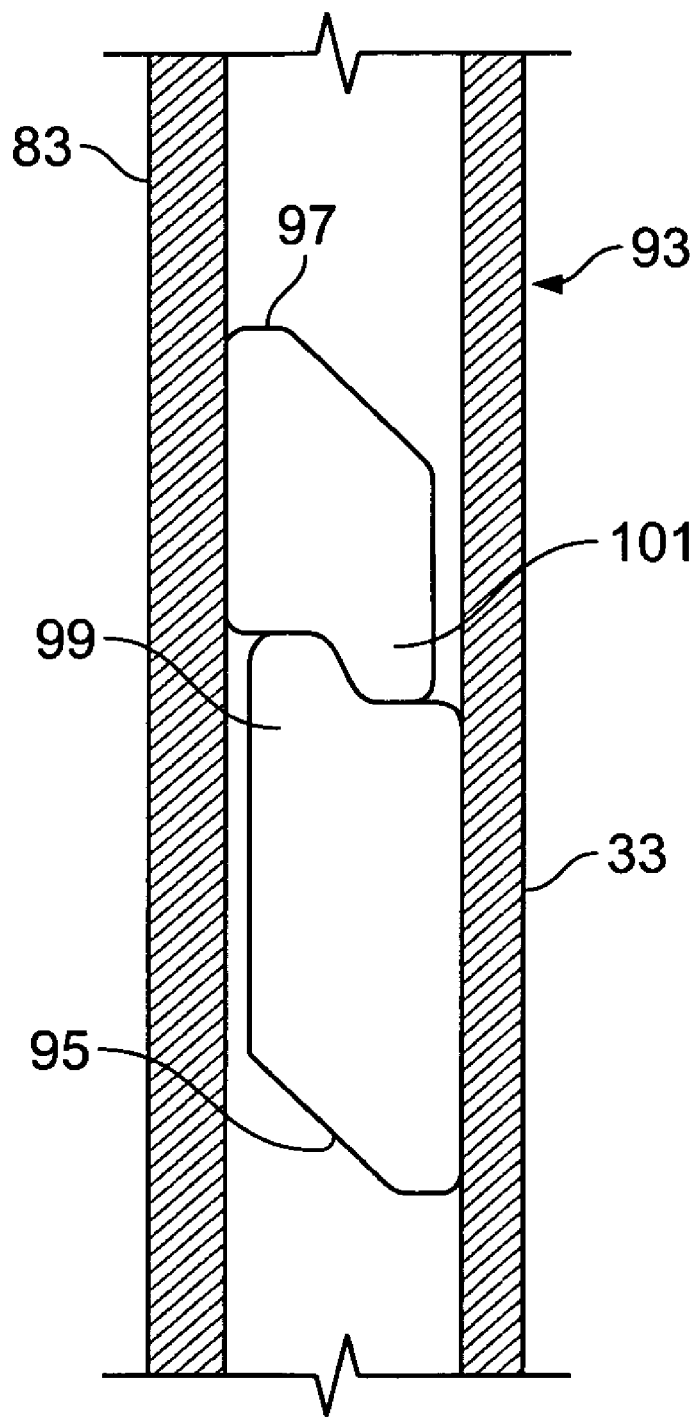
FIG. 14 is an enlarged fragmentary front elevational view of a wing latch which forms a part of the front folding agricultural implement frame.

Referring to FIG. 14, the left and right wings 15 and 17 are retained in their transport positions by respective wing latches 93. Each wing latch 93 includes a first wing latch member 95 mounted on the respective left or right side plate 31 or 33 of the clevis 29 (as shown in FIG. 5) and a second wing latch member 97 mounted on the respective upper caster wheel mount 83 (as shown in FIG. 8). Each first wing latch member 95 includes an upwardly projecting barb 99 which engages a downwardly projecting barb 101 on the respective second wing latch member 97 when the wings 15 and 17 are in their transport position.

The folding process begins with the frame 3 in the field position as shown in FIGS. 2 and 3. In this field position, the wings 15 and 17 extend outwardly generally perpendicular to the tongue 5. The rearward tongue section 9 is retracted relative to the forward tongue section 7. The tongue lift cylinders 49 and caster wheel lift cylinders 85 are retracted such that the tongue is lowered on the carriage 11 and the row units 2 (or other working tools) are in contact with the ground. The hitch cylinder 39 is retracted such that the rearward end 35 of the hitch 21 is lowered. The caster wheel pivot cylinders 87 are extended such that the caster wheel assemblies 69 are in their extended positions wherein the parallel links 79 and 81 extend forwardly from the respective wings 15 and 17 in generally perpendicular orientation thereto. The caster wheels 71 are generally rotated rearwardly under the parallel links 78 and 81.

The first step in folding the frame 3 is to raise the tongue 5 and wings 15 and 17 such that the row units 2 are off the ground and at a sufficient height to clear the tops of the wheels 13. This is done by extending the tongue lift cylinders 49, hitch cylinder 39 and caster wheel lift cylinders 85 as shown in FIGS. 4 and 5.

Next, the caster wheel pivot cylinders 87 are retracted to move the caster wheel assemblies 69 into their folded positions wherein the parallel links 79 and 81 are generally parallel to the wings 15 and 17 and in close proximity to the front edge faces thereof. The caster wheel assemblies 69 are shown midway between their field and folded positions in FIG. 6 and fully folded in FIGS. 7 and 8. As the caster wheel assemblies 69 are pivoted, the caster wheels 71 rotate into a forwardly extending position as in FIGS. 7.

Figure 10:
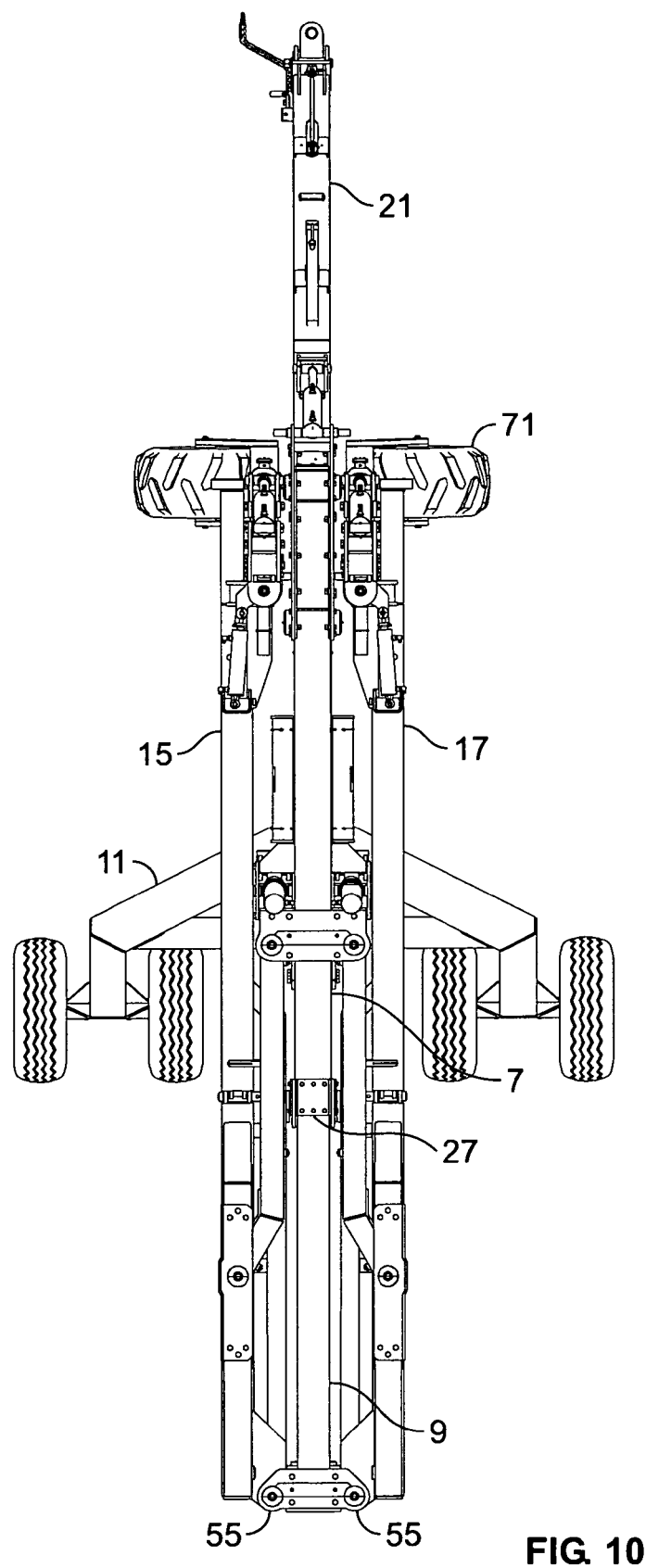
FIG. 10 is a top plan view of the front folding agricultural implement frame showing wings thereof in a fully folded position.
Figure 11:
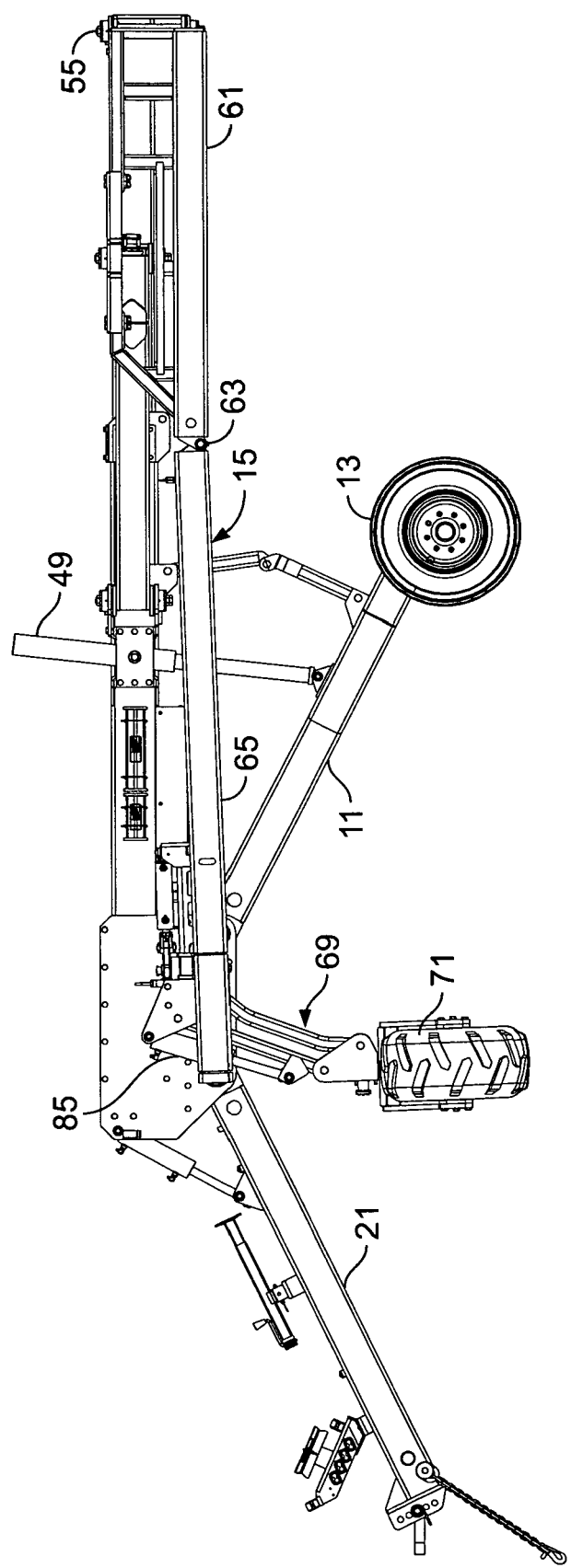
FIG. 11 is a left side elevational view of the frame of FIG. 10.

The wings 15 and 17 are next moved into their transport position by extending the tongue extension cylinder which causes the rearward tongue section 9 to extend rearwardly relative to the forward tongue section 7. As the rearward tongue section 9 moves rearwardly, the wings 15 and 17 are pulled forwardly by the wing links 57 and begin to pivot forwardly about the wing pivots 55. As the wings 15 and 17 move forwardly, the caster wheels 71 rotate rearwardly into the first position, allowing the detents 91 to engage. The wings 15 and 17 are shown midway between their field and folded positions in FIG. 9 and fully folded in FIGS. 10 and 11.

Once the wings 15 and 17 come forward into the transport position, the caster wheel lift cylinders 85 are retracted, lifting the caster wheels 71 off of the ground as seen in FIGS. 12 and 13. As the wheels 71 come up, the first wing latch members 95 engage the second wing latch members 97 to retain the wings 15 and 17 in the transport position.

The above detailed sequence of steps for folding the wings 15 and 17 into the transport position is generally reversed to unfold the wings 15 and 17 to return them to the field position.

It is to be understood that while certain forms of the present invention have been illustrated and described herein, it is not to be limited to the specific forms or arrangement of parts described and shown.

What is claimed and desired to be secured by Letters Patent is as follows:

1. A folding agricultural implement frame comprising:
   a) an extendable tongue having a forward tongue section and a rearward tongue section telescopically connected to said forward tongue section, said rearward tongue section moveable relative to said forward tongue section to vary a length of said tongue between a retracted length and a longer extended length;
   b) a hitch connected to said forward tongue section, said hitch securable to a towing vehicle;
   c) a wheel carriage mounted on said forward tongue section and supporting said frame above the ground; said wheel carriage connected to said forward tongue section such that the longitudinal position of said wheel carriage is fixed relative to said hitch; and
   d) left and right wings pivotally connected to said rearward tongue section and movable between an outwardly extending field position and a forwardly extending transport position.

2. The frame as in claim 1 and further including left and right wing links pivotally connected to said left and right wings, respectively and linking said left and right wings to said forward tongue section such that as said rearward tongue section extends relative to said forward tongue section said left and right wings move from said field position toward said transport position.

3. The frame as in claim 1 wherein said wheel carriage is pivotally connected to said forward tongue section and movable relative to said tongue to vary a vertical spacing between said tongue and the ground.

4. The frame as in claim 3 and further including a scissors linkage connected between said wheel carriage and said forward tongue section.

5. The frame as in claim 1 and further including a respective caster wheel assembly mounted on each of said left and right wings.

6. The frame as in claim 5 wherein each said caster wheel assembly includes a caster wheel rotatably mounted on a lower caster wheel mount, an upper caster wheel mount connected to the respective wing, and a pair of links connecting said lower caster wheel mount to said upper caster wheel mount.

7. The frame as in claim 6 wherein each said caster wheel assembly further includes a hydraulic actuator connected between one of said links and one of said caster wheel mounts, said hydraulic actuator being operable to vary a vertical spacing between said caster wheel and said respective wing.

8. The frame as in claim 6 wherein said upper caster wheel mount of each said caster wheel assembly is pivotable between a field position wherein said links are in substantially perpendicular relation to said respective wing and a transport position wherein said links are substantially parallel to said respective wing.

9. The frame as in claim 8 wherein each said caster wheel is connected to the respective lower caster wheel mount by a yoke having a caster pivot shaft rotatably received by said respective lower caster wheel mount and said yoke is pivotable about an upright axis defined by said caster pivot shaft.

10. The frame as in claim 9 wherein each said lower caster wheel mount includes a respective detent which engages the respective caster pivot shaft to hold the respective caster wheel in a fixed orientation when said respective wing is in its transport position.

11. The frame as in claim 10 wherein each said caster wheel rotates about a center of rotation which is offset from the respective caster pivot shaft by the respective yoke.

12. The frame as in claim 11 wherein each said caster wheel is generally perpendicular to said respective wing and said center of rotation is spaced outwardly from said respective wing when said caster wheel is in said fixed orientation.

13. The frame as in claim 6 wherein a pair of first wing latch members connected to said tongue each engage a respective second wing latch member mounted on a respective one of said upper caster wheel mounts when said wings are in said transport position.

14. The frame as in claim 13 wherein each said first wing latch member includes an upwardly extending barb which engages a respective downwardly extending barb on said respective second wing latch member.

15. The frame as in claim 1 wherein said hitch has a rearward end pivotally connected to said forward tongue section, said hitch being movable relative to said tongue to vary a vertical spacing between said tongue and the ground.

16. The frame as in claim 15 wherein said forward tongue section, said wheel carriage and said hitch are interconnected by a clevis having a pair of side plates positioned on opposite sides of said forward tongue section and fixedly connected thereto, said hitch rearward end being pivotally mounted between said side plates and said wheel carriage having a leg pivotally mounted between said side plates.

17. A folding agricultural implement frame comprising:
a) an extendable tongue having a forward tongue section and a rearward tongue section telescopically connected to said forward tongue section, said rearward tongue section movable relative to said forward tongue section to vary a length of said tongue between a retracted length and a longer extended length;
b) a hitch connected to said forward tongue section, said hitch securable to a towing vehicle;
c) a wheel carriage mounted on said forward tongue section and supporting said frame above the ground; said wheel carriage connected to said forward tongue section such that the longitudinal position of said wheel carriage is fixed relative to said hitch; and
d) left and right wings pivotally connected to said rearward tongue section; and
e) left and right wing links connecting said left and right wings respectively to said forward tongue section; wherein
f) as said rearward tongue section extends relative to said forward tongue section said left and right wings move from an outwardly extending field position toward a forwardly extending transport position.

18. The frame as in claim 17 wherein said wheel carriage is pivotally connected to said forward tongue section and movable relative to said tongue to vary a vertical spacing between said tongue and the ground.

19. The frame as in claim 17 and further including a respective caster wheel assembly mounted on each of said left and right wings.

20. The frame as in claim 19 wherein each said caster wheel assembly includes a caster wheel rotatably mounted on a lower caster wheel mount, an upper caster wheel mount connected to the respective wing, and a pair of links connecting said lower caster wheel mount to said upper caster wheel mount.

21. The frame as in claim 20 wherein each said caster wheel assembly further includes a hydraulic actuator connected between one of said links and one of said caster wheel mounts, said hydraulic actuator being operable to vary a vertical spacing between said caster wheel and said respective wing.

22. The frame as in claim 21 wherein said upper caster wheel mount of each said caster wheel assembly is pivotable between a field position wherein said links are in substantially perpendicular relation to said respective wing and a transport position wherein said links are substantially parallel to said respective wing.

23. The frame as in claim 17 wherein said hitch has a rearward end pivotally connected to said forward tongue section, said hitch being movable relative to said tongue to vary a vertical spacing between said tongue and the ground.

24. The frame as in claim 23 wherein said forward tongue section, said wheel carriage and said hitch are interconnected by a clevis having a pair of side plates positioned on opposite sides of said forward tongue section and fixedly connected thereto, said hitch rearward end being pivotally mounted between said side plates and said wheel carriage having a leg pivotally mounted between said side plates.

25. A folding agricultural implement frame comprising:
a) an extendable tongue having a forward tongue section and a rearward tongue section telescopically connected to said forward tongue section, said rearward tongue section movable relative to said forward tongue section to vary a length of said tongue between a retracted length and a longer extended length;
b) a clevis having a pair of side plates positioned on opposite sides of said forward tongue section and fixedly connected thereto;
c) a hitch having a rearward end pivotally connected between said side plates of said clevis;
d) a wheel carriage having a leg pivotally connected between said side plates of said clevis and such that the longitudinal position of said wheel carriage is fixed relative to said hitch, said wheel carriage supporting said frame above the ground;

e) left and right wings pivotally connected to said rearward tongue section; and f) left and right wing links connecting said left and right wings respectively to said forward tongue section; wherein g) as said rearward tongue section extends relative to said forward tongue section said left and right wings move from an outwardly extending field position toward a forwardly extending transport position.

26. The frame as in claim 25 and further including a first hydraulic actuator connected between said wheel carriage and said tongue and a second hydraulic actuator connected between said hitch and said clevis; said first and second hydraulic actuators being cooperatively operable to vary a spacing between said tongue and the ground.

27. The frame as in claim 26 and further including a respective caster wheel assembly mounted on each of said left and right wings.

28. The frame as in claim 27 wherein each said caster wheel assembly includes a caster wheel rotatably mounted on a lower caster wheel mount, an upper caster wheel mount connected to the respective wing, and a pair of links connecting said lower caster wheel mount to said upper caster wheel mount.

29. The frame as in claim 28 wherein each said caster wheel assembly further includes a respective third hydraulic actuator connected between one of said links and one of said caster wheel mounts, each said third hydraulic actuator being operable to vary a vertical spacing between the respective caster wheel and said respective wing.

30. The frame as in claim 28 wherein said upper caster wheel mount of each said caster wheel assembly is pivotable between a field position wherein said links are in substantially perpendicular relation to said respective wing and a transport position wherein said links are substantially parallel to said respective wing.

31. The frame as in claim 30 wherein each said caster wheel is connected to the respective lower caster wheel mount by a yoke having a caster pivot shaft rotatably received by said respective lower caster wheel mount and said yoke is pivotable about an upright axis defined by said caster pivot shaft.

32. The frame as in claim 31 wherein each said lower caster wheel mount includes a respective detent which engages the respective caster pivot shaft to hold the respective caster wheel in a fixed orientation when said respective wing is in its transport position.

33. The frame as in claim 32 wherein each said caster wheel rotates about a center of rotation which is offset from the respective caster pivot shaft by the respective yoke.

34. The frame as in claim 33 wherein each said caster wheel is generally perpendicular to said respective wing and said center of rotation is spaced outwardly from said respective wing when said caster wheel is in said fixed orientation.

35. The frame as in claim 28 and further including:
a) a pair of first wing latch members, each said first wing latch member being mounted on a respective one of said side plates of said clevis; and
b) a pair of second wing latch members, each said second wing latch member being mounted on a respective one of said upper caster wheel mounts; wherein
c) said first wing latch members are each engageable with a respective one of said second wing latch members when said wings are in said transport position.

36. The frame as in claim 35 wherein each said first wing latch member includes an upwardly extending barb which is engageable with a respective downwardly extending barb on said respective second wing latch member.

* * * * *